(12) United States Patent
Tangirala et al.

(10) Patent No.: US 7,602,721 B1
(45) Date of Patent: Oct. 13, 2009

(54) METHODS AND SYSTEMS FOR FINE GRAIN BANDWIDTH ALLOCATION IN A SWITCHED NETWORK ELEMENT

(75) Inventors: Ravi Tangirala, San Jose, CA (US); Meera Kasinathan, San Jose, CA (US); Rajarshi Gupta, Berkeley, CA (US); Justin Chueh, Palo Alto, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 934 days.

(21) Appl. No.: 10/743,858

(22) Filed: Dec. 22, 2003

(51) Int. Cl.
*H04L 12/26* (2006.01)
(52) U.S. Cl. .................................................. 370/235.1
(58) Field of Classification Search ...... 370/229–230.1, 370/235–235.1, 412
See application file for complete search history.

(56) References Cited

U.S. PATENT DOCUMENTS

| | | | | |
|---|---|---|---|---|
| 5,359,593 A | * | 10/1994 | Derby et al. | 370/234 |
| 5,625,622 A | * | 4/1997 | Johri | 370/235.1 |
| 5,815,491 A | * | 9/1998 | Guibert | 370/233 |
| 5,903,559 A | * | 5/1999 | Acharya et al. | 370/355 |
| 5,926,459 A | * | 7/1999 | Lyles et al. | 370/230 |
| 6,570,847 B1 | * | 5/2003 | Hosein | 370/230.1 |
| 6,801,500 B1 | * | 10/2004 | Chandran | 370/230.1 |

OTHER PUBLICATIONS

Perros, "An Introduction to ATM Networks", John Wiley & Sons, Ltd. (Chichester, England), p. 131-132, (2002).

* cited by examiner

*Primary Examiner*—Kevin C Harper
(74) *Attorney, Agent, or Firm*—Jenkins, WIlson, Taylor & Hunt, P.A.

(57) ABSTRACT

Methods and systems for fine grain bandwidth allocation are disclosed. According to one method, input is received from a user in a standard bandwidth denomination indicating bandwidth to be provided by a switched network element. The bandwidth is automatically converted into a base bandwidth value and a residual bandwidth value. The base bandwidth value is converted to a number of tokens to be placed in a token bucket every predetermined token bucket refresh interval. The residual bandwidth value is converted into a second number of tokens and a number of predetermined token bucket refresh intervals over which the second number of tokens is to be placed in the token buckets. The token buckets are then refreshed in accordance with the base and residual bandwidth values and the token bucket refresh intervals. The queue is serviced in accordance with available tokens in the token buckets.

32 Claims, 8 Drawing Sheets

METHODS AND SYSTEMS FOR FINE GRAIN BANDWIDTH ALLOCATION IN A SWITCHED NETWORK ELEMENT

TECHNICAL FIELD

The present invention relates to methods and systems for bandwidth allocation. More particularly, the present invention relates to methods and systems for fine grain bandwidth allocation in a switched network element.

BACKGROUND ART

Switched network elements, such as layer 2 switches, layer 3 routers, or any other type of switch that switches packets between input and output ports, maintain either input queues, output queues, or both to control the switching of packets to and from the network. For example, in an output-buffering switch, packets that arrive at the switch are classified according to the packet type and quality of service and are stored in an output queue to be scheduled in accordance with a variety of parameters, e.g. priority, bandwidth or relative time at which the particular queue was last serviced. Once the queue entry associated with the packet is scheduled, the packet is forwarded to an output port and sent over a network. In an input-buffering switch, packets may be queued at the input ports, scheduled, and forwarded to output ports for outbound transmission.

One mechanism for determining when a particular queue should be scheduled includes defining a bandwidth state for the queue. As used herein, the term "bandwidth state" refers to a state that indicates whether bandwidth being consumed by a particular queue is less than or greater than allocated bandwidth values for that queue. For example, a queue may be allocated minimum and maximum bandwidth values. The minimum bandwidth value may indicate a minimum guaranteed bandwidth that is to be allocated to the queue. The maximum bandwidth value may indicate a bandwidth that should not be exceeded.

Using the minimum and maximum bandwidth values, several states can be defined for a queue and the states can be used to control scheduling of the queue. For example, one state may indicate that the bandwidth currently being consumed by a queue is less than the minimum allocated bandwidth value. If the bandwidth currently being consumed is less than the minimum bandwidth value, the queue should be scheduled with high priority, so that bandwidth will increase to the minimum value. Another state may indicate that the bandwidth currently being consumed by a queue is between the minimum and maximum bandwidth values. In this state, the queue should be scheduled with low priority, since the level of service being provided to the queue is within the allocated bandwidth values. Yet another state may indicate that the bandwidth currently being consumed by the queue is greater than the maximum bandwidth value. In this bandwidth state, the queue should not be scheduled, since the queue is currently consuming more than its allocated bandwidth.

In order to properly schedule queues using bandwidth state, it is necessary to accurately measure the current bandwidth being consumed by a queue. One method for measuring the bandwidth consumed by a queue is to use token buckets. A token bucket is a hardware- or software-implemented algorithm that allows packets to be scheduled based on the number of tokens available in a token bucket. Tokens in the token bucket are refreshed at a predetermined rate. As long as there are sufficient tokens available in the token bucket, packets can be transmitted. If the bucket is empty or contains an insufficient number of tokens, packets waiting to be transmitted may be queued until sufficient tokens are present in the token bucket to allow the packet to be transmitted.

FIG. 1 is an example of a token bucket. In FIG. 1, a token bucket 100 stores a number of tokens referred to as a token count. Token bucket 100 is filled at a refresh rate R. A start threshold T that is greater than the maximum packet size is associated with the token bucket. For packets to be transmitted the number of tokens should be greater than or equal to T. The size of token bucket 100 may be set to a predetermined value based on an anticipated packet burst threshold.

When a queued packet 102 arrives at token bucket 100, queued packet 102 is transmitted if the token count in token bucket 100 is greater than T. In this example and in all of the remaining examples described herein, it is assumed that one token corresponds to one byte of transmitted data. Assuming T equals 1500 bytes, if queued packet 102 has 64 bytes of data, and there are at least 1500 tokens in token bucket 100, queued packet 102 will be transmitted as transmitted packet 104. The token count in token bucket 100 will then be decremented by 64 tokens.

In some network switch implementations, token buckets may be associated with queues that are associated with output ports. In one implementation, each queue may have a minimum token bucket and a maximum token bucket. The minimum token bucket contains tokens that are used to guarantee a minimum bandwidth value. The maximum token bucket contains tokens that are used to provide a maximum bandwidth value that should not be exceeded.

FIGS. 2A and 2B illustrate the use of minimum and maximum token buckets to control bandwidth provided to a queue. Referring to FIG. 2A, a minimum token bucket 200 contains 1560 tokens and a maximum token bucket 202 contains 1565 tokens at a time when a sixty-four-byte packet 204 arrives in an output queue with which the token buckets are associated. Referring to FIG. 2B, when sixty-four-byte packet 204 is transmitted as transmitted packet 206, sixty-four tokens are removed from each token bucket. In the illustrated example, minimum token bucket 200 now has 1496 tokens and maximum token bucket 202 now has 1501 tokens.

The number of tokens in the minimum and maximum token buckets may be used to determine the bandwidth state of a queue. For example, in FIG. 2A, since both token buckets have tokens greater than 1500, the bandwidth state of the queue is that the bandwidth currently being consumed by the queue is less than the minimum bandwidth. Accordingly, the queue would be scheduled with high priority. In FIG. 2B, since minimum token bucket 200 has less than 1500 tokens, and maximum token bucket 202 contains greater than 1500 tokens, the bandwidth currently being provided to the queue is between the minimum and maximum bandwidth values. Accordingly, the queue would be scheduled with low priority.

Since the bandwidth being provided to a queue depends on the number of tokens in the token bucket, it is desirable to control the token bucket refresh rate in order to provide the desired bandwidth. However, available literature on token buckets does not specify how to set a token bucket refresh rate in order to archive a desired bandwidth value. In addition, an end user of a switched network element may desire to specify bandwidth in standard denominations, such as kilobits per second, rather than token bucket refresh rates. Current literature on token buckets likewise does not specify how to convert standard bandwidth denominations into token bucket refresh rates. For example, Perros, *An Introduction to ATM Networks*, John Wiley and Sons, (2001) states that token buckets can be used for admission control in ATM networks.

However, details on converting bandwidth values to token bucket refresh rates are not provided.

It may also be desirable to allow a user to specify bandwidth in any increments that the user desires. For example, a user receiving one megabit per second of bandwidth may desire to change the bandwidth allocation to a particular queue to 1.5 megabits per second. Assuming a refresh rate of one token per refresh interval achieves a bandwidth of one megabit per second, it would be necessary to provide 1.5 tokens per refresh interval to achieve 1.5 megabits per second. However, since a token is assumed to be an atomic entity that cannot be divided into fractions, one possible solution is to provide three tokens during a first token bucket refresh interval, 0 tokens during a second refresh interval, and continuously repeat this pattern. Providing three tokens during the first refresh interval and 0 tokens during the second refresh interval would achieve the desired average bandwidth value of 1.5 megabits per second. However, traffic output from the queue would be bursty, since all of the tokens would be provided during the first refresh interval. This burstiness problem increase as incremental bandwidth allocation requires additional token bucket refresh intervals to be used. For instance, if the desired bandwidth is 1.1 megabits per second, 11 tokens may be refreshed during the first refresh interval, followed by 9 intervals with zero refreshes. Such an allocation scheme would allow incremental bandwidth allocation, but would further increase burstiness.

Accordingly, in light of these deficiencies associated with token-bucket-based scheduling algorithms, there exists a need for improved methods and systems for fine grain bandwidth allocation without burstiness in a switched network element.

DISCLOSURE OF THE INVENTION

The present invention includes methods and systems for fine grain bandwidth allocation in a switched network element. According to one method, a user specifies bandwidth value in a standard bandwidth denomination regarding the bandwidth to be allocated to a queue. For example, the user may specify minimum and maximum bandwidth values to be allocated to a queue in kilobits per second. The bandwidth value specified by the user may then be converted into a base value and a residual value. The base value is guaranteed every token bucket refresh interval to reduce burstiness. The residual value is the remaining bandwidth that will be provided over multiple token bucket refresh intervals. If a user specifies 1.1 megabits per second, the base value may be one megabit per second and the residual value may be 0.1 megabits per second.

In the next step, the base bandwidth value is converted into a first number of tokens to be placed in the token bucket every token bucket refresh interval. The residual bandwidth value is converted into a second number of tokens and number of token bucket refresh intervals at which the token bucket will be refreshed to provide the residual bandwidth value. The first number of tokens is then placed in the token bucket every token bucket refresh interval. The second number of tokens is placed in the token bucket every c token bucket refresh intervals to provide the residual bandwidth, where c is an integer equal to the number of token bucket refresh intervals needed to provide the residual bandwidth value, given a particular clock frequency. The queue may then be serviced in accordance with the tokens in the token bucket.

Because the present invention automatically converts bandwidth values specified by a user into token bucket refresh rates, the invention provides the ability for a user to modify the bandwidth being provided to a port without requiring hardware or software upgrades. In addition, because the invention provides a base bandwidth value every token bucket refresh interval and a residual value every predetermined number of token bucket refresh intervals, incremental bandwidth can be automatically added to or subtracted from the bandwidth provided to a queue while avoiding burstiness.

Accordingly, it is an object of the invention to provide methods and systems for fine grain bandwidth allocation in a switched network element.

It is another object of the invention to provide methods and systems for allocating incremental bandwidth to a queue while avoiding burstiness.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
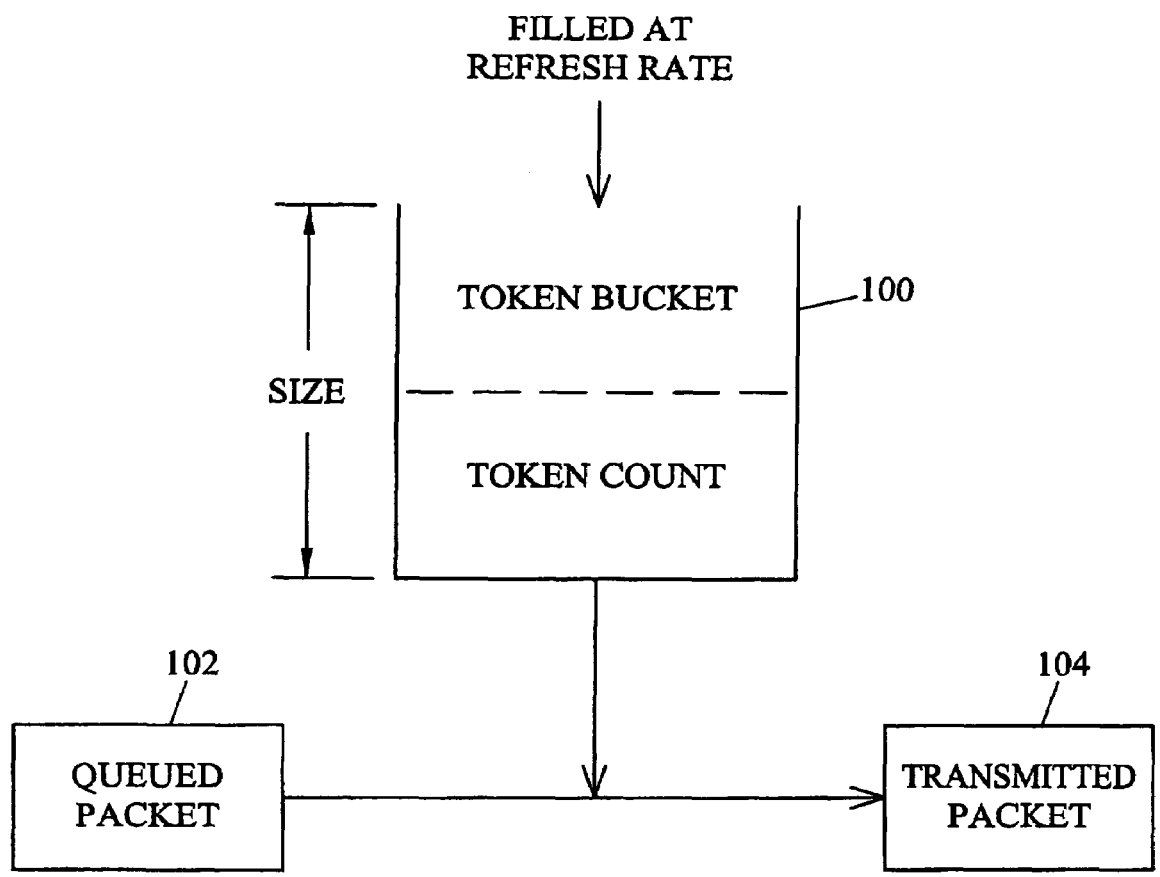
FIG. 1 is a block diagram of a conventional token bucket.
Figure 2A:
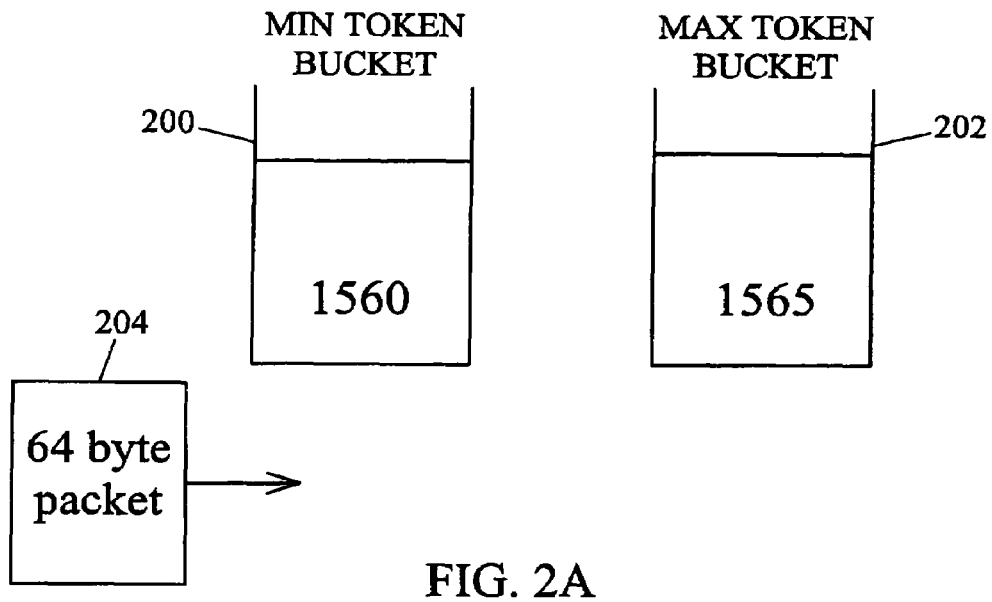
FIGS. 2A and 2B are block diagrams illustrating scheduling of a packet using minimum and maximum token buckets.
Figure 2B:
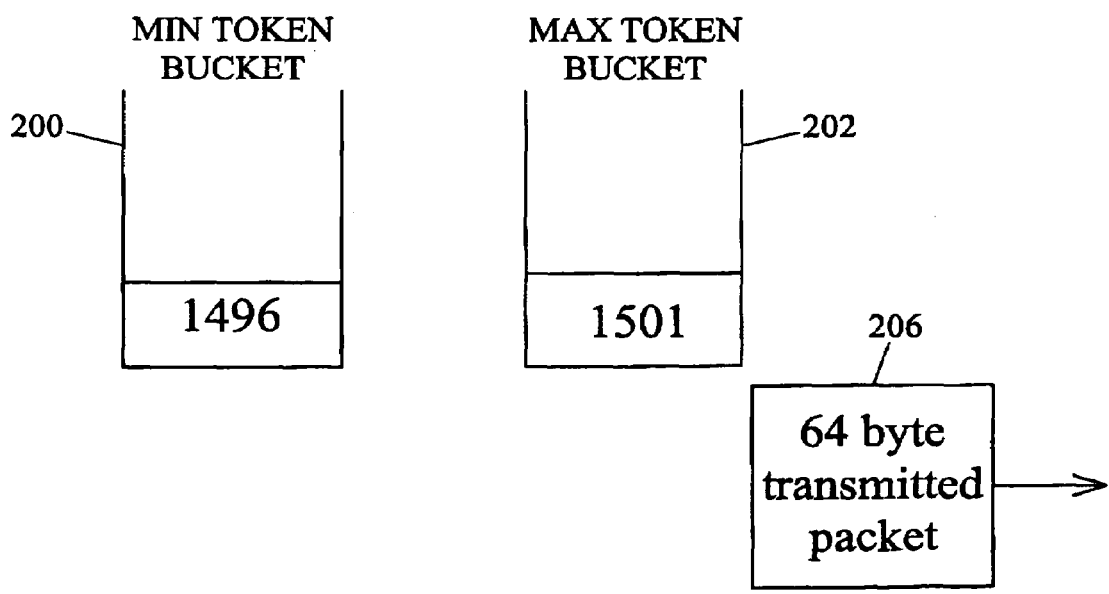
Figure 3:
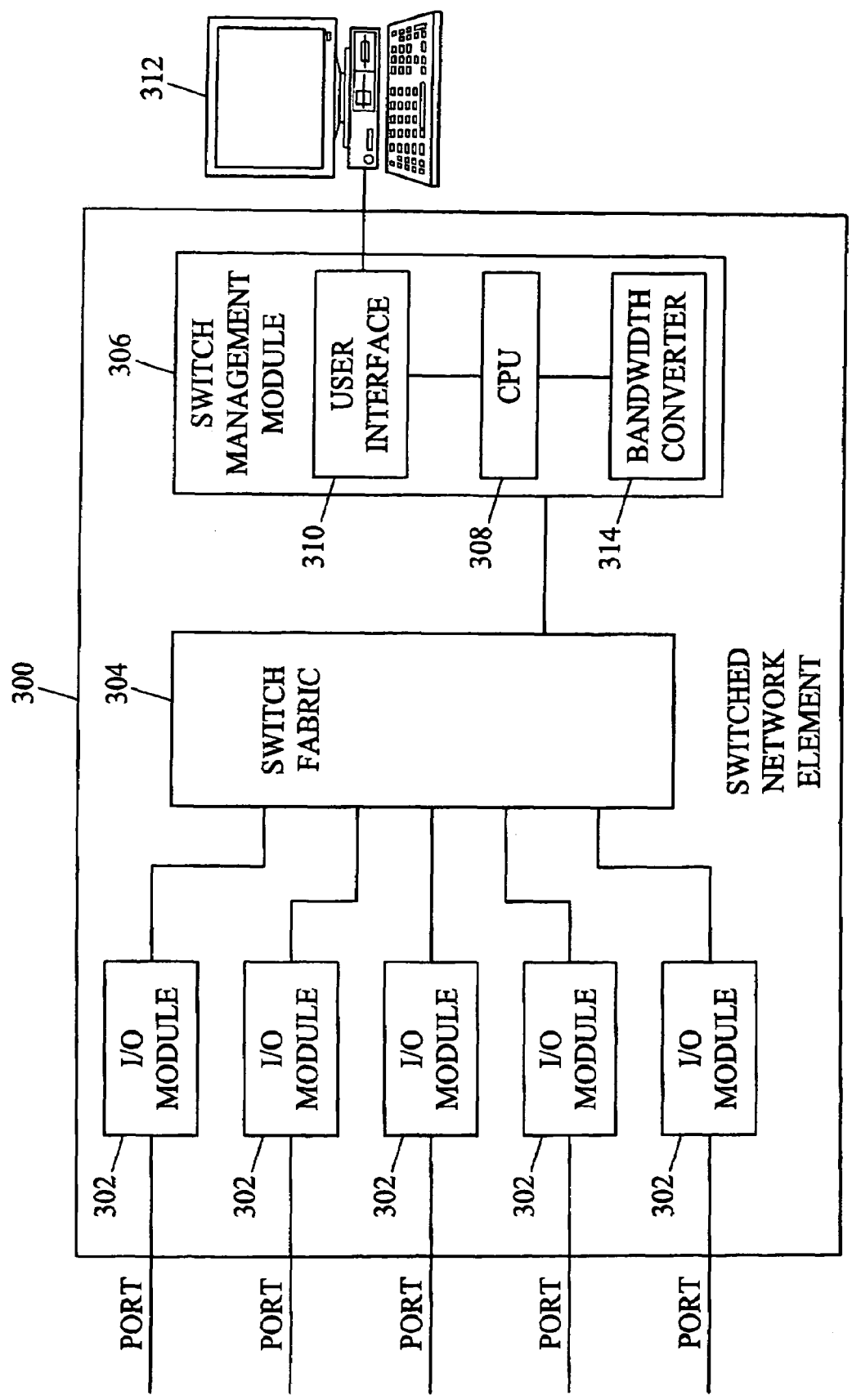
FIG. 3 is a block diagram of a switched network element in which embodiments of the present invention may be implemented.

As stated above, the present invention may be implemented in a switched network element, such as a layer 2 switch or a layer 3 router. FIG. 3 is a block diagram of a layer 2 switch in which embodiments of the present invention may be implemented. Referring to FIG. 3, a switched network element 300 includes a plurality of input/output (I/O) modules 302, a switch fabric 304, and a switch management module (SMM) 306. I/O modules 302 include hardware and software for receiving packets and forwarding the packets to other I/O modules for transmission over an outbound network port. Switch fabric 304 may include a bus or other suitable medium for transferring packets or frames between input and output ports and SMM 306. In addition, as will be described in detail below, switch fabric 304 may also include hardware for queuing packets, implementing token buckets, refreshing the token buckets based on the fine grain bandwidth allocation algorithms described herein, and scheduling packets using the token buckets. Internal components of switch fabric 304 will be described in detail below.

Switch management module 306 may include a central processing unit 308 and a user interface 310. Central processing unit 308 performs switch management functions, MAC address learning, and other administrative functions associated with switched network element 300. User interface 310 provides an interface for an external device, such as user terminal 312, that allows a user to specify and dynamically modify bandwidth provided to queues in switched network element 300. For example, a user may specify bandwidth values to be provided on a particular port in kilobits per second via terminal 312. User interface 310 may communicate this information to CPU 308. A bandwidth converter 314 may convert the user bandwidth values to token bucket refresh rates and communicate this information to a traffic manager for use in refreshing token buckets. An exemplary bandwidth conversion algorithm will be described in detail below.

Figure 4:
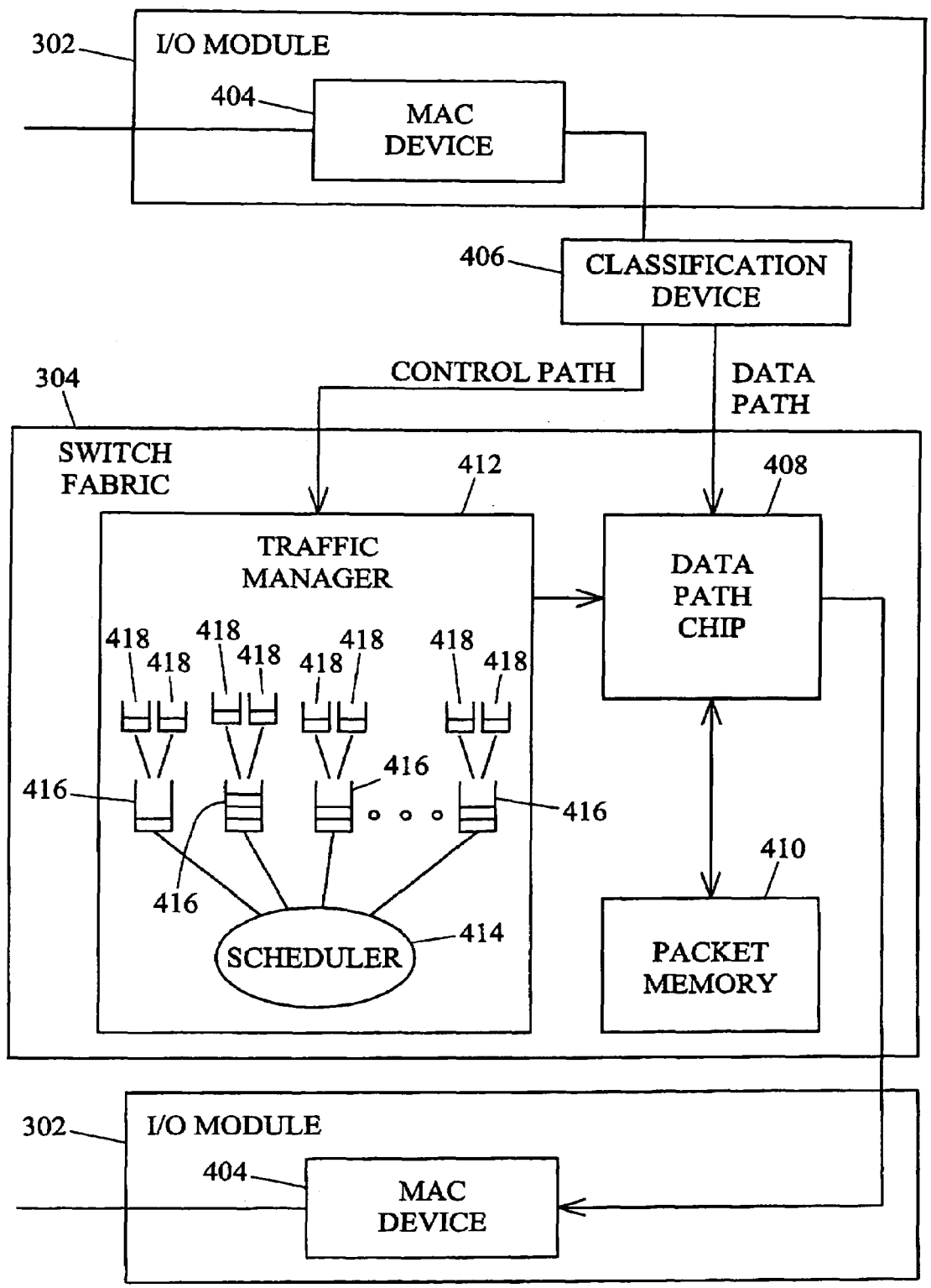
FIG. 4 is a block diagram illustrating components of the switched network element in FIG. 3 that may utilize fine grain bandwidth allocation according to an embodiment of the present invention.

FIG. 4 is a block diagram illustrating exemplary components of switched network element 300 in more detail. Referring to FIG. 4, I/O module 302 includes a medium access control (MAC) device 404 for performing link layer functions, such as framing, error detection, and error correction. A classification device 406 classifies incoming packets based on packet type, quality of service, etc. Once classification device 406 classifies a packet, the packet is forwarded to switch fabric 304. Switch fabric 304 includes a data path chip 408 that reads packets from packet memory 410 and writes packets to packet memory 410. A traffic manager 412 includes a scheduler 414 that schedules packets to be forwarded to output ports.

When data path chip 408 writes a packet to packet memory 410, traffic manager 412 generates a buffer pointer for the packet. The buffer pointer is queued in one of a plurality of output queues 416 associated with potentially multiple output ports. The buffer pointers may be stored in traffic manager 412 as linked lists. Traffic manager 412 generates the next available free buffer in packet memory 410 and sends the address to data path chip 408. Data path chip 408 uses the address to write the packet to packet memory.

According to one aspect of the present invention, traffic manager 412 implements a plurality of token buckets 418 to control the scheduling of queues 416 and uses token bucket refresh rates to provide fine grain bandwidth allocation without burstiness. In one example, traffic manager 412 may implement a min token bucket and a max token bucket for each queue 416. Traffic manager 412 may control the refresh rate of each token bucket 418 based on bandwidth values specified by a user.

Once scheduler 414 schedules a packet, the corresponding pointer is extracted from the queue 416 and used by data path chip 408 to extract the packet from packet memory 410. Data path chip 408 then forwards the packets to the I/O module 302 associated with the output port. Scheduler 414 updates the corresponding token buckets by decrementing the token buckets by the appropriate amount.

In one implementation, scheduler 414 may utilize bandwidth state, as described above, as one parameter to schedule output queues. Additional parameters that may be used include priority of a packet, as defined by one or more parameters in the packet, and LRU (least recently used). LRU is an indicator of the time since a queue has been serviced relative to other queues in a switch. Priority is an indicator of the relative priority of a queue with respect to other queues in a switch. In one scheduling algorithm, the bandwidth state may be given the highest weight in scheduling each queue, followed by priority and LRU.

Figure 5:
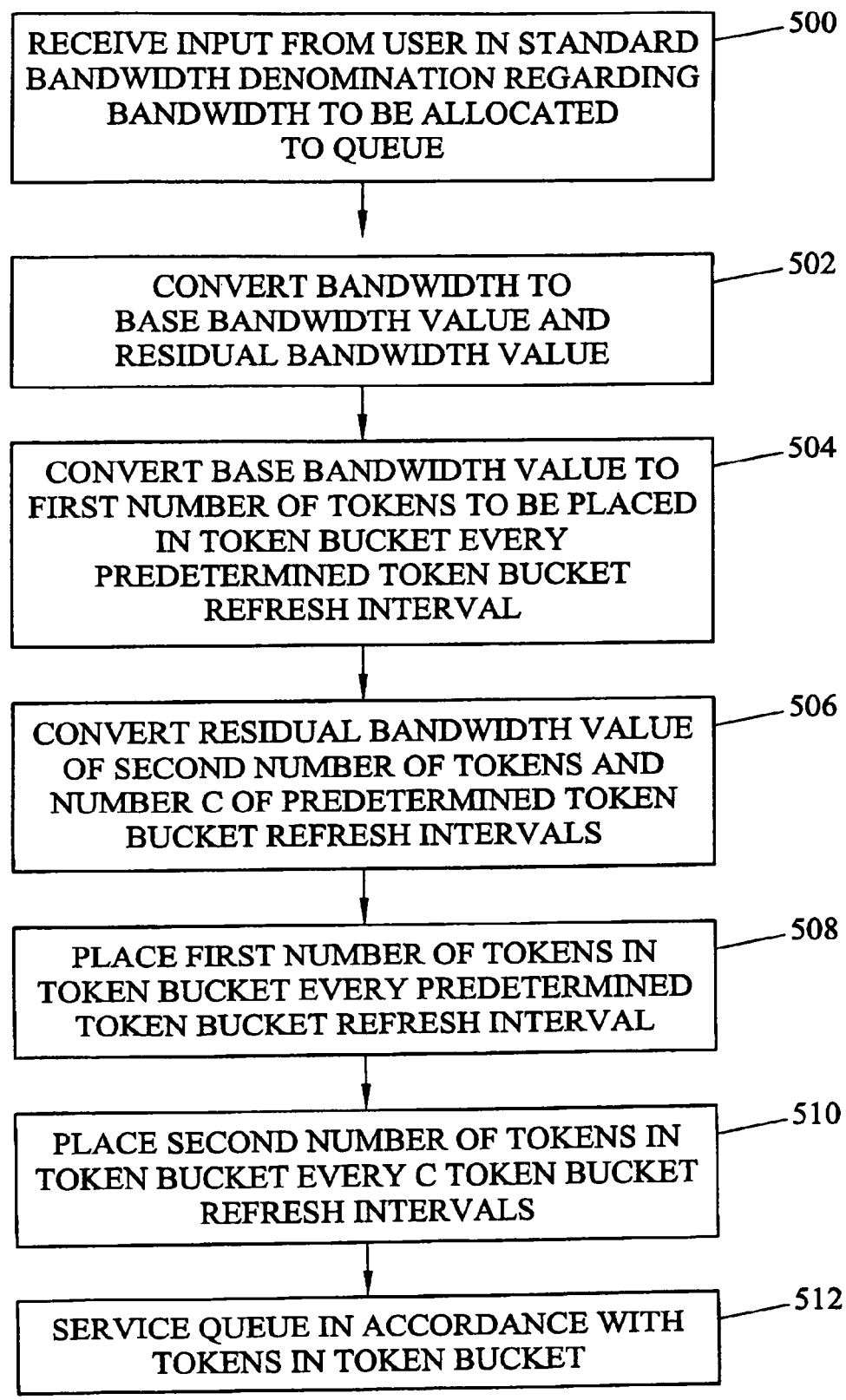
FIG. 5 is a flow chart illustrating exemplary steps for fine grain bandwidth allocation in a switched network element according to an embodiment of the present invention.

FIG. 5 is a flow chart illustrating exemplary steps for fine grain bandwidth allocation according to an embodiment of the present invention. The steps illustrated in FIG. 5 may be implemented by traffic manager 412 illustrated in FIG. 4 based on bandwidth values input by user via user interface 310 and converted by bandwidth converter 314. Referring to FIG. 5, in step 500, user interface 310 receives input from a user regarding bandwidth to be allocated to a queue. The user may specify bandwidth in any suitable standard bandwidth denomination, such as kilobits per second. The user may specify a single bandwidth value to be allocated to a queue or minimum and maximum bandwidth values. In step 502, the bandwidth value is converted into a base bandwidth value and a residual bandwidth value. The base bandwidth value may be set to a predetermined value that may be guaranteed every token bucket refresh interval and a residual bandwidth value that may be spread over multiple token bucket refresh intervals. For example, the base bandwidth value may be on the order of one megabit per second and the residual bandwidth value may be on the order of less than one megabit per second. In one example, if a user desires to allocate 1.1 megabits per second to a queue, the base bandwidth value may be set to one megabit per second and the residual bandwidth value may be set to 0.1 megabits per second. Similarly, if the user desires to allocate 9.1 megabits per second to the queue, the base bandwidth value may be set to nine megabits per second and the residual bandwidth value may be set to 0.1 megabits per second. By guaranteeing a base bandwidth value every token bucket refresh interval and providing the residual bandwidth value over multiple token bucket refresh intervals, the present invention allows the user to specify any increment of bandwidth to be allocated to a queue and to allocate such bandwidth without burstiness.

In steps 504 and 506, bandwidth converter 314 illustrated in FIG. 3 converts the base and residual bandwidth values to first and second token bucket refresh rates. More particularly, in step 504, the base bandwidth value is converted to a first number of tokens to be placed in the token buckets of a switched network element every predetermined token bucket refresh interval. The predetermined token bucket refresh interval may be operator configurable and may be set to the time that is at least equal to the time required to refresh all of the token buckets of the switched network element. For example, due to hardware and software limitations, it may be possible to update each token bucket in a switched network element every 100 clocks. In such an implementation, the predetermined token bucket refresh interval may set to at least 100 clocks, in order to allow all of the token buckets to be refreshed. As will be described in more detail below, the token bucket refresh interval may be set to an interval that is greater than the time required to refresh all of the token buckets to allow the second number of tokens to be written in token buckets associated with some of the queues during each token bucket refresh interval.

In one exemplary implementation, the token bucket refresh rates in order to provide the base and residual bandwidth values can be calculated using the following equation:

$$c = \frac{f \times n \times 8}{M \times \text{min refresh interval}}, \quad (1)$$

where:

c=number of intervals per update for each queue, f=clock frequency in clocks/sec or Hertz, n=number of tokens to be placed in each token bucket every c intervals, and M=desired bandwidth in bits/sec.

In order to calculate the number of tokens to be refreshed every minimum token bucket refresh interval, the variable c in Equation 1 can be set to 1, and Equation 1 can be solved for n. Solving Equation 1 for n, $$n = \frac{M \times \min \text{ refresh interval}}{8 \times f}.$$

Thus, if the user desires to allocate 8 gigabits per second of bandwidth, the minimum token bucket refresh interval 100 clocks, 1 token equals 1 byte, and the clock frequency is 1 gigahertz, the minimum number of tokens required per token bucket refresh interval is calculated as follows:

$$n = \frac{(8 \times 10^9 \text{bits/sec}) \times (100 \text{ clocks})}{(8 \text{ bits/token}) \times (1 \times 10^9 \text{ clocks/sec})}$$

=100 tokens per minimum token bucket refresh interval.

The above desired base bandwidth of 8 gigabits per second can be achieved by refreshing the token buckets associated with each queue with one hundred tokens every minimum token bucket refresh interval. Thus, the base bandwidth value can be achieved without burstiness.

Equation 1 can also be used to compute the number of tokens and number of minimum token bucket refresh intervals in which the token buckets must be refreshed to achieve the residual bandwidth value. Since the variable c in Equation 1 is equal to the number of intervals per update, solving Equation 1 for c, the following equation is obtained:

$$c = \frac{f \times n \times 8}{M \times \min \text{ refresher interval}}$$

Let n=1 token for maximum bandwidth resolution.

$$c = \frac{f \times 8}{M \times \min \text{ refresher interval}}, \quad (3)$$

Thus, continuing with the example above, if it is desirable to achieve 8.01 gigabits per second of bandwidth, Equation 3 can be used to determine the number of minimum token bucket refresh intervals required to provide this additional bandwidth as follows:

$$c = \frac{8 \times (1 \times 10^9 \text{clocks/sec})}{(1 \times 10^7 \text{bits/sec}) \times (100 \text{ clocks})}$$

=8 minimum token bucket refresh intervals

Combining the results above, in order to achieve an incremental bandwidth of 0.01 gigabits per second, one token may be added to the token buckets for the queue every 8 minimum token bucket refresh intervals. Thus, 8.01 Gigabits per second may be achieved by refreshing the token buckets with one hundred tokens every minimum token bucket refresh interval and one token every eight token bucket refresh intervals. By guaranteeing a base bandwidth value every token bucket refresh interval and providing the residual bandwidth value over multiple token bucket refresh intervals, fine grain bandwidth allocation can be achieved without burstiness.

Table 1 shown below illustrates additional examples of desired bandwidth values, tokens, and number of minimum token bucket refresh intervals for a different clock frequency and minimum token bucket refresh interval than the example above. The values in Table 1 assume a clock frequency of 167 megahertz, one token corresponds to one byte, and a minimum token bucket refresh interval of 1336 clocks. The minimum token bucket refresh interval is based on the time required to refresh all of the token buckets in the switch with the base token value plus some of the token buckets with the residual token value.

TABLE 1

Desired Bandwidth, Number of Tokens n per Refresh Interval, and Number of Refresh Intervals c

| Desired Bandwidth | n (# of Tokens) | c (# of Refresh Intervals) |
|---|---|---|
| 62.5 Kbps | 1 | 16 |
| 500 Kbps | 8 | 16 |
| 1 Mbps | 1 | 1 |
| 1 Gbps | 1000 | 1 |
| 10 Gbps | 10000 | 1 |

The values in Table 1 are based on an actual hardware implementation of traffic manager 412 according to an embodiment of the present invention. As illustrated in Table 1, if the minimum desired bandwidth resolution to be achieve is 62.5 kilobits per second then one token can be placed in the token bucket every 16 minimum token bucket refresh intervals. If the desired bandwidth is 500 kilobits per second, then eight tokens can be placed in the token bucket every 16 minimum token bucket refresh intervals. If the desired bandwidth is one megabit per second, then one token may be placed in the token bucket every token bucket refresh interval. If the desired bandwidth is one gigabit per second, 1000 tokens may be placed in the token bucket every token bucket refresh interval. If the desired bandwidth is ten gigabits per second, 10,000 may be placed in the token bucket every token bucket refresh interval. In the example illustrated by Table 1, incremental bandwidth that is less than one megabit per second may be provided by placing one token in the token bucket over multiple minimum token bucket refresh intervals, as described above.

The algorithm described above can be used to refresh all of the token buckets in a switched network element with the residual token amount by refreshing all of the token buckets with the base token value and some of the token buckets with the residual token value every minimum token bucket refresh interval. Hereinafter, the minimum token bucket refresh interval value will be referred to as a sub round robin. The number of sub round robins required to achieve the residual bandwidth value, represented by the variable c in Equation 1 above, will hereinafter be referred to as a super round robin. Thus, there are c sub round robins in one super round robin.

To further illustrate the concepts of sub and super round robins, the data in Table 1 can be used. Using the first row in Table 1 above, the desired maximum bandwidth resolution is 62.5 kilobits per second. In order to achieve this bandwidth resolution, one token must be placed in the token buckets every 16 token bucket refresh intervals. Thus, for this example, a super round robin includes 16 sub round robins.

Since there are typically multiple ports and therefore multiple token buckets that must be refreshed, different sets of token buckets may be refreshed with the residual token value during each sub round robin so that all of the token buckets will be refreshed with the residual token value during each super round robin. For example, if a switch has 128 ports, and a super round robin is equal to 16 sub round robins, it may be desirable to refresh 128/16=8 ports with the residual token value during each sub round robin so that when the super round robin ends, all 128 ports will have been refreshed once with the residual token value. Dividing the refreshing of the token buckets with the residual token value into sets decreases the length of each sub round robin and provides a less bursty bandwidth allocation across all of the ports of the switch versus a scheme where the residual token value is written to all of the token buckets during the same sub round robin.

Thus, to summarize, the length of the sub round robin may be selected based on hardware constraints for refreshing the token buckets associated with all of the queues in a switch. The length of the super round robin may be selected using Equation 3 above to calculate c, the number of minimum token bucket refresh intervals, in order to achieve the maximum bandwidth resolution specified by the user. In calculating c, the number of tokens n, to be refreshed every c intervals, is set to 1 for maximum bandwidth resolution.

Once the number of sub round robins, c, per super round robin is calculated, it is necessary to determine whether to refresh tokens each sub round robin or each super round robin, based on the actual bandwidth that the user desires to achieve. In order to determine how tokens should be allocated, the bandwidth achieved by refreshing one token in the token buckets associated with each queue during every sub round robin is calculated. If the bandwidth desired by the user is greater than or equal to this calculated bandwidth value, the token buckets must be refreshed during every sub round robin. If the desired bandwidth to be achieved is less than this calculated value, the token buckets associated with each queue are refreshed every super round robin.

Using the data in Table 1 as an example, if one token is placed in the token buckets associated with each queue every sub round robin, 1 megabit per second of bandwidth is achieved. Thus, if the user desires to achieve increments of bandwidth that are 1 megabit per second or greater, these increments will be achieved by refreshing the token buckets associated with each queue every sub round robin. If the user desires to achieve bandwidth increments that are less than 1 megabit per second, such incremental bandwidth may be provided by refreshing the token buckets associated with each queue every super round robin. Thus, by dividing bandwidth allocation between sub and super round robins, fine grain bandwidth increments can be achieved without burstiness.

Figure 6A:
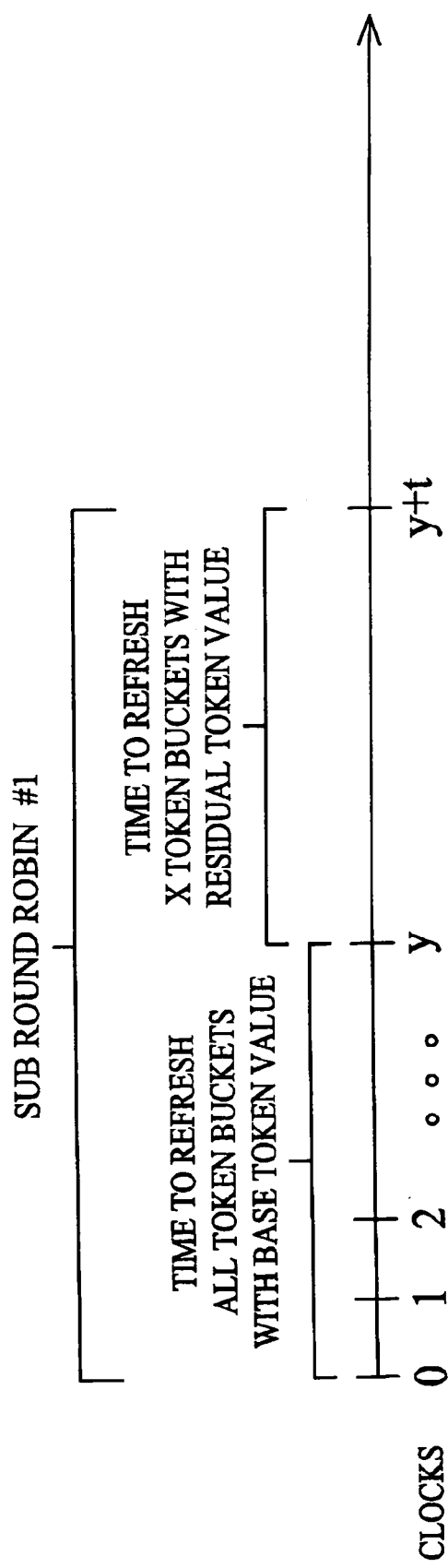
FIGS. 6A-6C are timing diagrams illustrating exemplary sub round robin and super round robin token bucket refresh intervals for refreshing token buckets associated with the a plurality of queues in a switched network element according to an embodiment of the present invention.
Figure 6B:
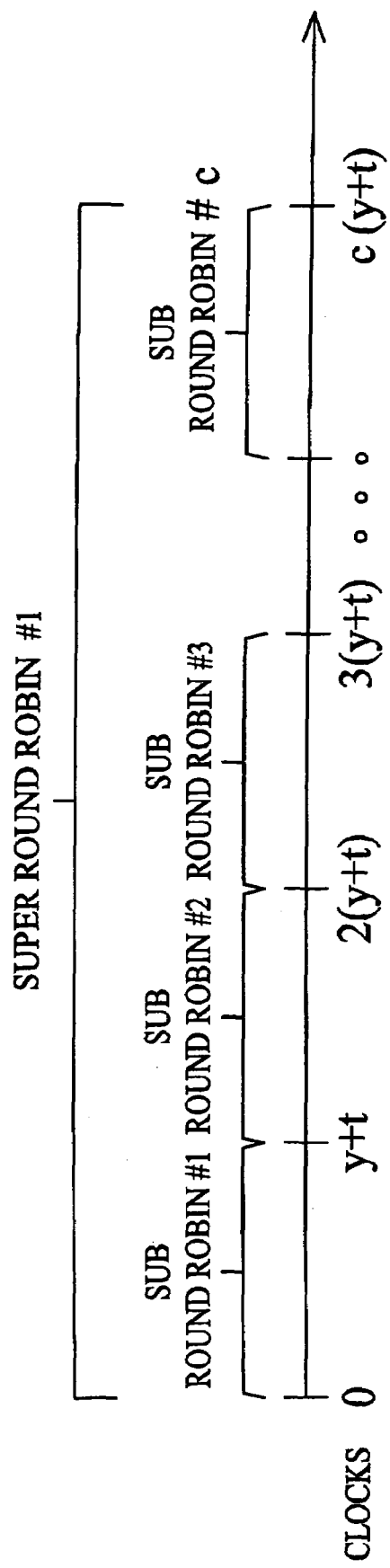
Figure 6C:
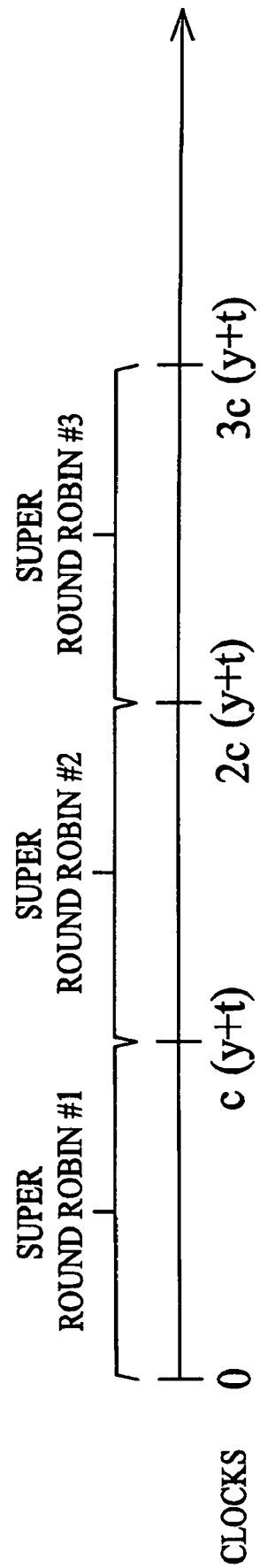

FIGS. 6A-6C illustrate sub and super round robin token bucket refresh intervals according to an embodiment of the present invention. Referring to FIG. 6A, one sub round robin corresponds to the time to refresh the token buckets associated with all of the ports in a switch with a base token value and to refresh some of the token buckets with a residual token value. The additional time may be set based on the number of ports times the fraction that a sub round robin is of a super round robin. Thus, if a super round robin corresponds to eight sub round robins, and there are 128 ports, then the additional time added to each sub round robin will be the time required to update 128/8 or 16 ports. In FIG. 6A, the time to refresh all of the ports in a switch with a base token value is represented by the variable y. The additional time required to refresh x ports, where x=numports*(sub round robin)/(super round robin), is represented by the variable t.

Referring to FIG. 6B, one super round robin is made up of a c sub round robins. The number c may be calculated using Equation 3 above to achieve the desired bandwidth resolution. Each sub round robin is equal to the number of clocks required to refresh the token buckets of all output ports plus the number of clocks required to refresh 8 ports with the residual token value.

Referring to FIG. 6C, super round robins may be repeated continuously. Thus, by spreading the residual token bucket updates over a super round robin interval and updating token buckets with the base token value every sub round robin interval, incremental updates to bandwidth can be achieved without burstiness.

Returning to FIG. 5, once the base and residual bandwidth values have been converted, control proceeds to step 508 where the base tokens are placed in the token bucket every predetermined token bucket refresh interval and to step 510 where the residual tokens are placed in the token bucket every c token bucket refresh intervals. In step 512, the queue is serviced in accordance with the tokens in the token bucket. Servicing the queue may include scheduling the queue based on a combination of bandwidth state, priority, and least recently used, as described above. Thus, using the steps in FIG. 5, fine grain bandwidth allocation can be achieved without burstiness.

Although in the example described above, the user inputs desired bandwidth in a standard bandwidth denomination, such as kilobits per second, the present invention is not limited to such an embodiment. User interface 310 described above may allow a user to directly set the sub round robin token bucket refresh interval, the super round robin token bucket refresh interval, and the amount of tokens to be placed in the token buckets during each token bucket refresh interval. In yet another alternative, user interface 310 may allow the user to input token bucket refresh rates. In an implementation in which a user inputs token bucket refresh intervals or rates directly, these values may be written into hardware and used to control bandwidth allocation in the manner described above. In addition, bandwidth converter 314 may convert the values input by the user to standard bandwidth denominations for display to the user so that the user can see the result of the selected token bucket refresh rates.

The present invention includes improved methods and systems for fine grain bandwidth allocation in a switched network element. In one example, bandwidth values input by user in a standard bandwidth domination may be converted into token bucket refresh rates and token bucket refresh intervals. A base token value may be placed in the token buckets associated with a particular queue every token bucket refresh interval to guarantee a base bandwidth value. A residual number of tokens may be placed in the token buckets associated with a particular queue over a number of token bucket refresh intervals to provide a residual bandwidth value. Thus, by automatically converting user entered bandwidth values into token bucket refresh rates, the present invention allows the bandwidth allocated to a particular queue to be changed by the user on the fly. In addition, by providing base and residual token bucket refreshes over one or more token bucket refresh intervals, incremental bandwidth allocation can be achieved without burstiness.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for allocating bandwidth to a switch while reducing burstiness in message traffic, the method comprising:
   (a) receiving input from a user regarding bandwidth to be allocated to at least one queue in a switch;
   (b) converting the bandwidth into a base bandwidth value and a residual bandwidth value;
   (c) automatically converting the base bandwidth value to a first number of tokens to be placed in a token bucket associated with the queue every predetermined token bucket refresh interval;
   (d) automatically converting the residual bandwidth value to a second number of tokens and a number c of the predetermined token bucket refresh intervals, c being an integer, wherein the base bandwidth value is achieved by placing the first number of tokens in the token bucket every predetermined token bucket refresh interval and wherein the residual bandwidth value is achieved by placing the second number of tokens in the token bucket every c predetermined token bucket refresh intervals; and
   (e) servicing the queue in accordance with the tokens in the token bucket.

2. The method of claim 1 wherein receiving input from a user regarding bandwidth to be allocated to at least one queue in a switch includes receiving a bandwidth value from the user in a standard bandwidth denomination.

3. The method of claim 2 wherein the standard bandwidth denomination comprises kilobits per second.

4. The method of claim 1 wherein converting the bandwidth into a base value and a residual value includes calculating a first bandwidth value achieved by placing one token in the token bucket every predetermined token bucket refresh interval, and selecting the base and residual bandwidth values based on the first bandwidth value.

5. The method of claim 4 wherein selecting the base and residual bandwidth values based on the first bandwidth value includes setting the base bandwidth value to a portion of the bandwidth value requested by the user that is greater than the first bandwidth value and setting the residual bandwidth value to a portion of the bandwidth entered by the user that is less than the first bandwidth value.

6. The method of claim 1 wherein the predetermined token bucket refresh interval is equal to a first value being at least the number of clock cycles required to update token buckets associated with a predetermined set of the queues in the switch, thereby providing the base bandwidth value to the predetermined set of queues.

7. The method of claim 6 wherein the first value is greater than the number of clock cycles required to update the token buckets associated with the predetermined set of queues in the switch by a predetermined number of additional clock cycles, and wherein the additional clock cycles are used to refresh token buckets associated with a portion of the predetermined set of queues every predetermined token bucket refresh interval with the second number of tokens so that all of the token buckets associated with the predetermined set of queues will be updated with the second number of tokens every c predetermined token bucket refresh intervals, thereby providing the residual bandwidth value to each queue in the predetermined set of queues.

8. The method of claim 1 wherein the first and second numbers of tokens, the predetermined token bucket refresh interval, and c are configurable by the user.

9. The method of claim 1 wherein automatically converting the base and residual bandwidth values includes automatically converting the bandwidth values using software and using the converted values to program packet scheduling hardware.

10. The method of claim 1 wherein automatically converting the residual bandwidth to a second number of tokens and a number c of minimum token bucket refresh intervals includes setting the second number of tokens to a predetermined fixed value and calculating the number c that achieves the residual bandwidth.

11. The method of claim 10 wherein calculating the number c includes calculating the number c using the following equation:

$$c = 8*f/(M*I),$$

where f is the clock frequency in clock cycles per second, M is the residual bandwidth in bits per second, and I is the predetermined token bucket refresh interval in clock cycles.

12. The method of claim 1 wherein the base bandwidth value is on the order of 1 megabit per second (Mbps) and the residual bandwidth value is on the order of less than 1 Mbps.

13. The method of claim 1 wherein the base bandwidth value is on the order of 1 gigabit per second (Gbps) and the residual bandwidth value is on the order of less than 1 Gbps.

14. The method of claim 1 wherein servicing the queue in accordance with the tokens in the token bucket includes scheduling the queue based on a bandwidth state associated with the queue.

15. The method of claim 14 wherein the bandwidth state indicates whether the bandwidth allocated to the queue has been exceeded.

16. The method of claim 14 wherein scheduling the queue based on the bandwidth state includes scheduling the queue based on a combination of bandwidth state, a priority assigned to the queue with respect to other queues in the switch and a relative time since the queue has been serviced with respect to other queues in the switch.

17. A method for allocating bandwidth to a queue in a switch, the method comprising:
   (a) receiving, from a user, a desired bandwidth in a standard bandwidth denomination to be provided by a switch;
   (b) automatically converting the desired bandwidth into a base bandwidth value and a residual bandwidth value, wherein the base bandwidth value includes a bandwidth that is guaranteed to be provided every token bucket refresh interval by refreshing a first number of tokens every token bucket refresh interval and the residual bandwidth value includes a bandwidth that is spread over multiple token bucket refresh intervals by refreshing a second number of tokens every c token bucket refresh intervals, c being an integer greater than one, and wherein the base bandwidth value is greater than the residual bandwidth value;
   (c) refreshing at least one token bucket associated with the switch according to the base and residual bandwidth values; and
   (d) scheduling at least one queue in the switch to be serviced based on available tokens in the token bucket.

18. The method of claim 17 wherein the second number of tokens comprises a single token, thereby achieving a minimum bandwidth resolution.

19. A method for allocating bandwidth to a queue in a switch, the method comprising:
   (a) receiving, from a user, a desired bandwidth in a standard bandwidth denomination to be provided by a switch;
   (b) automatically converting the desired bandwidth to at least one token bucket refresh rate, wherein automatically converting the desired bandwidth to the at least one token bucket refresh rate includes converting the desired bandwidth into a base bandwidth value and a residual bandwidth value, computing a first token bucket refresh rate corresponding to the base bandwidth value and a second token bucket refresh rate corresponding to the residual bandwidth value;

(c) refreshing at least one token bucket associated with the switch at the at least one token bucket refresh rate; and (d) scheduling at least one queue in the switch to be serviced based on available tokens in the token bucket, wherein scheduling at least one queue in the switch to be serviced based on available tokens in the token bucket includes scheduling the queue based on bandwidth state of the queue.

20. The method of claim 19 wherein scheduling the queue based on bandwidth state of the queue includes assigning a bandwidth state to the queue based on whether bandwidth consumed by the queue is less than a minimum bandwidth value, between minimum and maximum bandwidth values, or greater than the maximum bandwidth value.

21. The method of claim 19 wherein scheduling the queue based on bandwidth state of the queue includes scheduling the queue based on bandwidth state, relative priority of the queue with respect to other queues in the switch, and relative time that the queue has been serviced as compared to the other queues in the switch.

22. A system for fine grain bandwidth allocation in a switched network element without burstiness, the system comprising:

(a) a user interface operatively associated with the switched network element for receiving input from a user regarding a desired bandwidth to be provided by the switched network element;

(b) a bandwidth converter operatively associated with the user interface for:
converting the bandwidth value received from the user into a base bandwidth value and a residual bandwidth value, wherein the base bandwidth value includes a bandwidth that is guaranteed to be provided every token bucket refresh interval by refreshing a first number of tokens every token bucket refresh interval and the residual bandwidth value includes a bandwidth that is spread over multiple token bucket refresh intervals by refreshing a second number of tokens every c token bucket refresh intervals, c being an integer greater than one, and wherein the base bandwidth value is greater than the residual bandwidth value;

(c) a traffic manager operatively associated with the bandwidth converter for maintaining a plurality of queues for scheduling packets to be forwarded from the switched network element, for maintaining at least one token bucket for each queue, and for refreshing the token buckets according to the base and residual bandwidth values; and (d) a scheduler operatively associated with the traffic manager for scheduling the queues to be serviced based on tokens present in the token bucket for each queue.

23. A system for fine grain bandwidth allocation in a switched network element without burstiness, the system comprising:

(a) a user interface operatively associated with the switched network element for receiving input from a user regarding a desired bandwidth to be provided by the switched network element;

(b) a bandwidth converter operatively associated with the user interface for converting the bandwidth value received from the user into at least one token bucket refresh rate, wherein the bandwidth converter is adapted to convert the bandwidth value into base token value to be input in the token buckets every predetermined token bucket refresh interval and a number of token bucket refresh intervals in which a residual token value is to be placed into each of the token buckets;

(c) a traffic manager operatively associated with the bandwidth converter for maintaining a plurality of queues for scheduling packets to be forwarded from the switched network element, for maintaining at least one token bucket for each queue, and for refreshing the token buckets at the at least one token bucket refresh rate; and (d) a scheduler operatively associated with the traffic manager for scheduling the queues to be serviced based on tokens present in the token bucket for each queue, wherein the scheduler is adapted to schedule the queues based on bandwidth state of the queues.

24. The system of claim 23 wherein the scheduler is adapted to schedule the queues based on bandwidth state, relative priority of each queue in the switch, and relative time since each queue was last serviced.

25. The method of claim 17 wherein receiving a desired bandwidth in a standard bandwidth denomination to be provided by a switch includes receiving a desired bandwidth value from the user in a denomination comprising bits per second and wherein automatically converting the desired bandwidth to at least one token bucket refresh rate includes automatically converting the bandwidth in bits per second into the at least one token bucket refresh rate.

26. The method of claim 17 wherein receiving a desired bandwidth to be provided by a switch includes receiving input from a user regarding minimum and maximum bandwidth values to be provided by a switch and wherein automatically converting the desired bandwidth to at least one token bucket refresh rate includes converting the minimum and maximum bandwidth values to token bucket refresh rates at which minimum and maximum token buckets associated with the switch will be refreshed.

27. The method of claim 17 wherein automatically converting the desired bandwidth to at least one token bucket refresh rate includes automatically writing the at least one token bucket refresh rate into hardware associated with the queue.

28. A system for fine grain bandwidth allocation in a switched network element without burstiness, the system comprising:

(a) a user interface operatively associated with the switched network element for receiving input from a user regarding a desired bandwidth to be provided by the switched network element;

(b) a bandwidth converter operatively associated with the user interface for converting the bandwidth value received from the user into at least one token bucket refresh rate, wherein the bandwidth converter is adapted to convert the bandwidth value into base token value to be input in the token buckets every predetermined token bucket refresh interval and a number of token bucket refresh intervals in which a residual token value is to be placed into each of the token buckets;

(c) a traffic manager operatively associated with the bandwidth converter for maintaining a plurality of queues for scheduling packets to be forwarded from the switched network element, for maintaining at least one token bucket for each queue, and for refreshing the token buckets at the at least one token bucket refresh rate, wherein the traffic manager is adapted to maintain first and second token buckets associated with each queue in the switched network element, the first token bucket being adapted to control a minimum bandwidth to be allocated to each queue and the second token bucket being adapted to control a maximum bandwidth to be allocated to each queue; and (d) a scheduler operatively associated with the traffic manager for scheduling the queues to be serviced based on tokens present in the token bucket for each queue.

29. The system of claim 28 wherein the user interface is adapted to receive the minimum and maximum bandwidth values from the user in a standard bandwidth denomination.

30. The system of claim 29 wherein the standard bandwidth denomination comprises bits per second.

31. The system of claim 29 wherein the bandwidth converter is adapted to convert the bandwidth values from the standard bandwidth denomination to token bucket refresh rates.

32. The system of claim 22 wherein the bandwidth converter is adapted to convert bandwidth in kilobits per second into token bucket refresh rates.

* * * * *

UNITED STATES PATENT AND TRADEMARK OFFICE
CERTIFICATE OF CORRECTION

PATENT NO. : 7,602,721 B1
APPLICATION NO. : 10/743858
DATED : October 13, 2009
INVENTOR(S) : Tangirala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1602 days.

Signed and Sealed this

Fifth Day of October, 2010

David J. Kappos
*Director of the United States Patent and Trademark Office*